(12) United States Patent
Araki et al.

(10) Patent No.: US 9,354,695 B2
(45) Date of Patent: May 31, 2016

(54) POWER SUPPLY APPARATUS, PROCESSING APPARATUS, AND INFORMATION PROCESSING SYSTEM

(71) Applicant: FUJITSU LIMITED, Kawasaki-shi (JP)

(72) Inventors: Tatsuo Araki, Kawasaki (JP); Hironobu Kageyama, Kawasaki (JP); Kazuhiko Itakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 258 days.

(21) Appl. No.: 13/872,204

(22) Filed: Apr. 29, 2013

(65) Prior Publication Data

US 2014/0040642 A1 Feb. 6, 2014

(30) Foreign Application Priority Data

Jul. 31, 2012 (JP) ................. 2012-169297

(51) Int. Cl.
  *G06F 1/32* (2006.01)
  *H02M 1/00* (2006.01)
(52) U.S. Cl.
  CPC ............ *G06F 1/3296* (2013.01); *H02M 1/00* (2013.01); *Y10T 307/707* (2015.04)
(58) Field of Classification Search
  CPC .............. G06F 1/00; G06F 1/04; G06F 1/12; G06F 1/26; G06F 1/32; G06F 11/30; G06F 15/16
  See application file for complete search history.

(56) References Cited

U.S. PATENT DOCUMENTS

| 5,637,982 | A | 6/1997 | Nanno et al. |
| 6,465,909 | B1 * | 10/2002 | Soo ................. H02J 1/102 307/52 |
| 7,739,527 | B2 * | 6/2010 | Rothman et al. ............. 713/320 |
| 8,645,719 | B2 * | 2/2014 | Lee ................. 713/300 |

(Continued)

FOREIGN PATENT DOCUMENTS

| CN | 1367415 A | 9/2002 |
| CN | 101385215 A | 3/2009 |

(Continued)

OTHER PUBLICATIONS

Chinese Office Action mailed Jul. 14, 2015 for corresponding Chinese Patent Application No. 201310206488.9, with English Translation, 25 pages.

(Continued)

*Primary Examiner* — Thomas Lee
*Assistant Examiner* — Mohammad A Rahman
(74) *Attorney, Agent, or Firm* — Fujitsu Patent Center

(57) ABSTRACT

Each of the power supply units in a power supply apparatus includes a voltage conversion circuit that converts input voltage into output voltage within a predetermined voltage range an output capacitor that outputs supply power while accumulating charges according to the voltage converted by the voltage conversion circuit, and an overload detection circuit that detects an overload of the output capacitor and when the overload is detected, notifies an apparatus operated using the power supplied from the power supply apparatus of an overload signal requesting a suppression of power consumption.

13 Claims, 6 Drawing Sheets

(56) References Cited

U.S. PATENT DOCUMENTS

| | | | |
|---|---|---|---|
| 9,009,500 B1* | 4/2015 | Fan et al. | 713/300 |
| 2001/0050547 A1 | 12/2001 | Takimoto et al. | |
| 2002/0099962 A1 | 7/2002 | Nakamura | |
| 2003/0163395 A1* | 8/2003 | Patanaik et al. | 705/28 |
| 2004/0003305 A1* | 1/2004 | Tokunaga | G06F 1/263 |
| | | | 713/300 |
| 2005/0022043 A1 | 1/2005 | Yamaji et al. | |
| 2008/0301476 A1 | 12/2008 | Itakura | |
| 2009/0083557 A1* | 3/2009 | Ichikawa | G06F 9/5088 |
| | | | 713/310 |
| 2010/0085014 A1* | 4/2010 | Saeki et al. | 320/134 |
| 2012/0017104 A1 | 1/2012 | Siba et al. | |
| 2013/0162036 A1* | 6/2013 | Mangattur | G06F 1/26 |
| | | | 307/18 |
| 2014/0129865 A1* | 5/2014 | Kojima | G06F 1/3203 |
| | | | 713/324 |

FOREIGN PATENT DOCUMENTS

| | | |
|---|---|---|
| CN | 102317886 A | 1/2012 |
| JP | 5-181430 | 7/1993 |
| JP | 11-18295 | 1/1999 |
| JP | 11-338555 | 12/1999 |
| JP | 2001-352750 | 12/2001 |
| JP | 2004-213503 A | 7/2004 |
| JP | 2011-147285 A | 7/2011 |

OTHER PUBLICATIONS

Japanese Office Action mailed Mar. 22, 2016 for corresponding Japanese Patent Application No. 2012-169297, with Partial English Translation, 5 pages.

* cited by examiner

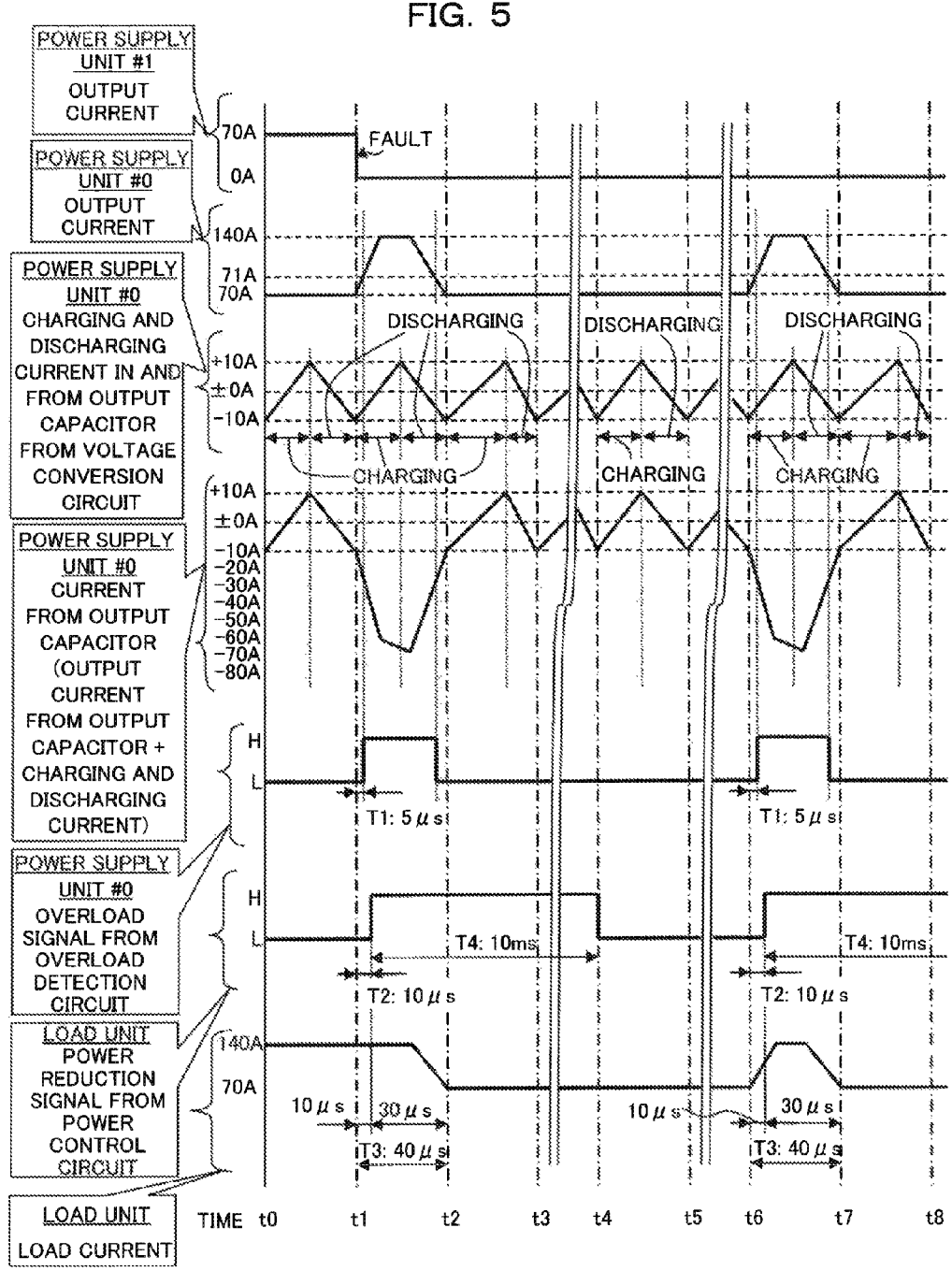

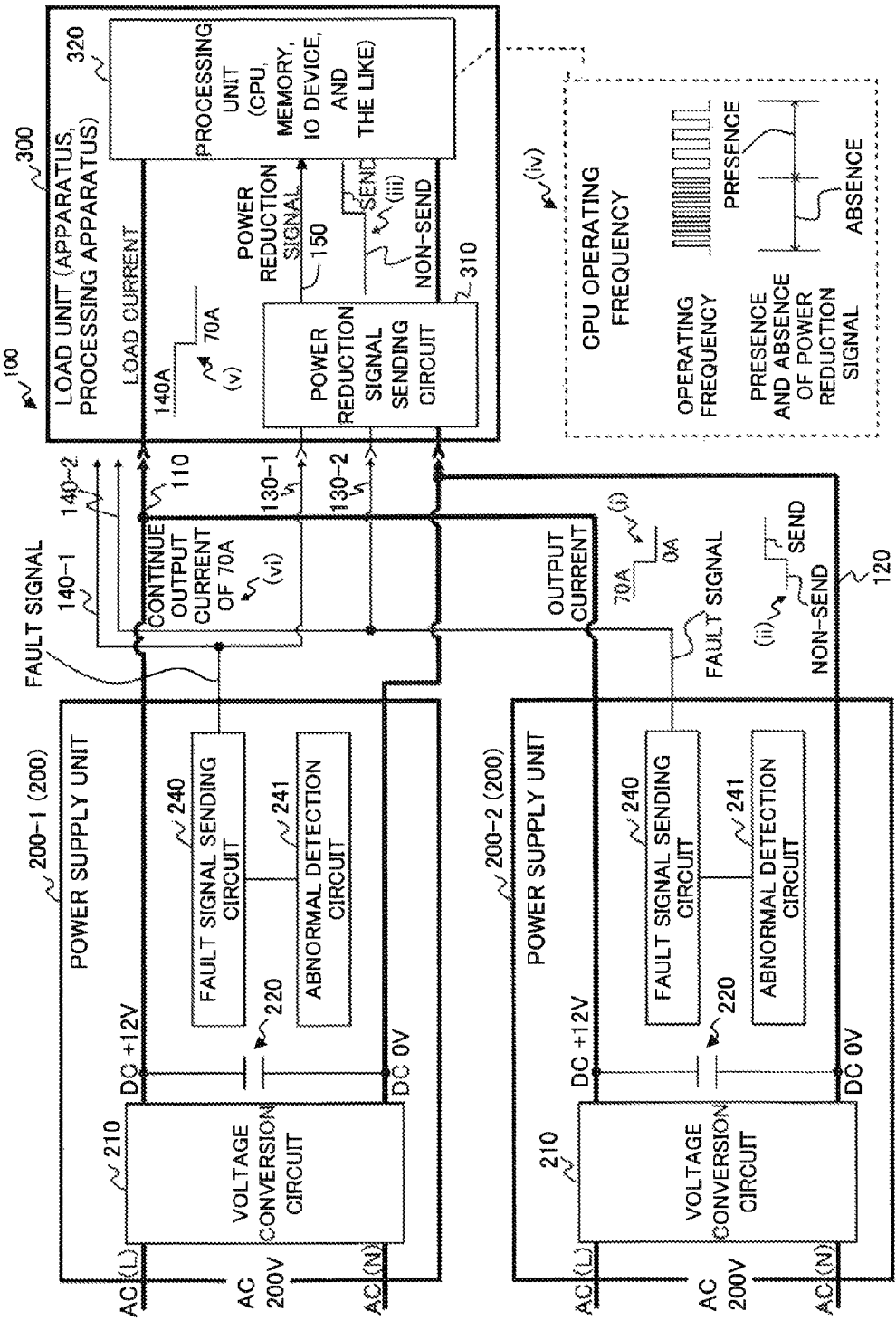

US 9,354,695 B2

POWER SUPPLY APPARATUS, PROCESSING APPARATUS, AND INFORMATION PROCESSING SYSTEM

CROSS-REFERENCE TO RELATED APPLICATION

This application is based upon and claims the benefit of priority of the prior Japanese Patent Application No. 2012-169297, filed on Jul. 31 2012, the entire contents of which are incorporated herein by reference.

FIELD

The present invention relates to a power supply apparatus, a processing apparatus, and an information processing system.

BACKGROUND

An information processing system including a plurality of power supply units is short of power and therefore may be down if only one power supply unit is in a faulty state, when the information processing system is operated by N (N is an integer of 2 or more) power supply units that are required in terms of a design of the system. Therefore, in the related art, in order to avoid the system down, there is a case in which the power supply unit is operated in an N+1 redundant configuration.

Further, in the information processing system including the N power supply units, a technique has known that the system saves power using a fault signal of the faulty power supply unit, in order to continue to operate the system, even when one power supply unit is faulty (see, for example, Patent Literature 1 or 2).

FIG. 6 is a diagram for describing an example of power supply control processing in an information processing system 100. As illustrated in FIG. 6, the information processing system 100 includes plural, for example, two power supply units 200-1 and 200-2 (hereinafter, simply referred to as power supply unit 200 when there is no need to differentiate the power supply units 200-1 and 200-2) and a load unit 300.

Each power supply unit 200 includes a voltage conversion circuit 210, an output capacitor 220, a fault signal sending circuit 240, and an abnormal detection circuit 241.

The voltage conversion circuit 210 converts input voltage of AC 200 V from AC (L) and AC (N) into predetermined output voltage (DC voltage of DC+12 V) and supplies power to the load unit 300 via power lines 110 and 120. The output capacitor 220 stabilizes and outputs the output voltage converted by the voltage conversion circuit 210. The abnormal detection circuit 241 detects the abnormality (for example, the abnormality of the output voltage or the abnormality of temperature) of the power supply unit 200. The fault signal sending circuit 240 sends the fault signal to the load unit 300, and the like, via a control line 130-1, 130-2, 140-1 or 140-2 when the abnormality of the power supply unit 200 is detected by the abnormal detection circuit 241.

The load unit 300 is operated using power supplied from the power supply unit 200 and includes a power reduction signal sending circuit 310 and a processing unit 320 including a central processing unit (CPU), a memory, an input output (IO) device, and the like. When receiving the fault signal from the power supply unit 200, the power reduction signal sending circuit 310 instructs the processing unit 320 via a control line 150 to reduce power consumption. When receiving the power reduction instruction, the processing unit 320 performs power saving.

Hereinafter, a detailed example will be described with reference to FIG. 6. As an example, when the load of the system is maximum, the load current of the system (load unit 300) is 140 A and when the power supply units 200-1 and 200-2 are normally operated, the power supply units 200-1 and 200-2 each output the output current of 70 A.

In FIG. 6, for example, when the power supply unit 200-2 is faulty, the output current of the power supply unit 200-2 is changed from 70 A to 0 A (see (i) in FIG. 6) and the power supply unit 200-2 sends the fault signal to the load unit 300 (see (ii) in FIG. 6). The power reduction signal sending circuit 310 of the load unit 300 receives the fault signal from the power supply unit 200-2 and instructs the processing unit 320 to reduce power (see (iii) in FIG. 6). The processing unit 320 receives the power reduction instruction to reduce, for example, an operating frequency (see (iv) in FIG. 6) and suppresses the load current of the system to the supply current 70 A of the power supply unit 200-1 (see (v) in FIG. 6). Therefore, even when the power supply unit 200-2 is faulty, the system may be operated with the supply current 70 A of the power supply unit 200-1, such that the system may not be short of power and may be continuously operated. Further, the output current of the power supply unit 200-1 is increased from 70 A to 140 A, but the load current of the load unit 300 is reduced to 70 A, according to the fault of the power supply unit 200-2, such that the power supply unit 200-1 may continuously output 70 A (see (vi) in FIG. 6).

[Patent Literature 1] Japanese Laid-open Patent Publication No. 11-338555
[Patent Literature 2] Japanese Laid-open Patent Publication No. 11-18295
[Patent Literature 3] Japanese Laid-Open Patent Publication No. 2001-352750
[Patent Literature 4] Japanese Laid-Open Patent Publication No. 5-181430

As described above, the information processing system in which the power supply unit has an N+1 redundant configuration includes a power supply unit of required numbers (N numbers) or more, which leads to an increase in cost.

Further, in the example illustrated in FIG. 6, the information processing system 100 including two (N) power supply units uses the fault signal from the power supply unit 200 so as to allow the load unit 300 to uniformly perform the power saving. For this reason, even in the state in which the system may be operated with the supply power of one (N−1) power supply unit, such as the state in which the number of empty slots of the IO is increased and thus the load power of the system is extremely small, and the like, when the fault of one power supply unit 200-2 is detected by the system, the processing unit 320 carries out the unnecessary power saving. In addition, since the power saving is continued until the faulty power supply unit 200-2 is exchanged with the normal power supply unit 200, the performance of the system is continuously reduced.

SUMMARY

According to an aspect of the embodiments, a power supply apparatus includes a plurality of power supply units that supply power, and each of the power supply units includes: a voltage conversion circuit that converts input voltage into output voltage within a predetermined voltage range; an output capacitor that outputs supply power while accumulating charges according to the voltage converted by the voltage conversion circuit; and an overload detection circuit that detects an overload of the output capacitor and when the overload is detected, notifies an apparatus operated using the power supplied from the power supply apparatus of an overload signal requesting a suppression of power consumption.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a time chart for describing an example of the power supply control processing in the information processing system illustrated in FIG. 4; and FIG. 6 is a diagram for describing an example of a power supply control processing in the information processing system.

DESCRIPTION OF EMBODIMENTS

Hereinafter, embodiments of the present invention will be described with reference to the accompanying drawings.

[1] Embodiment

[1-1] Description of Information Processing System

Figure 1:
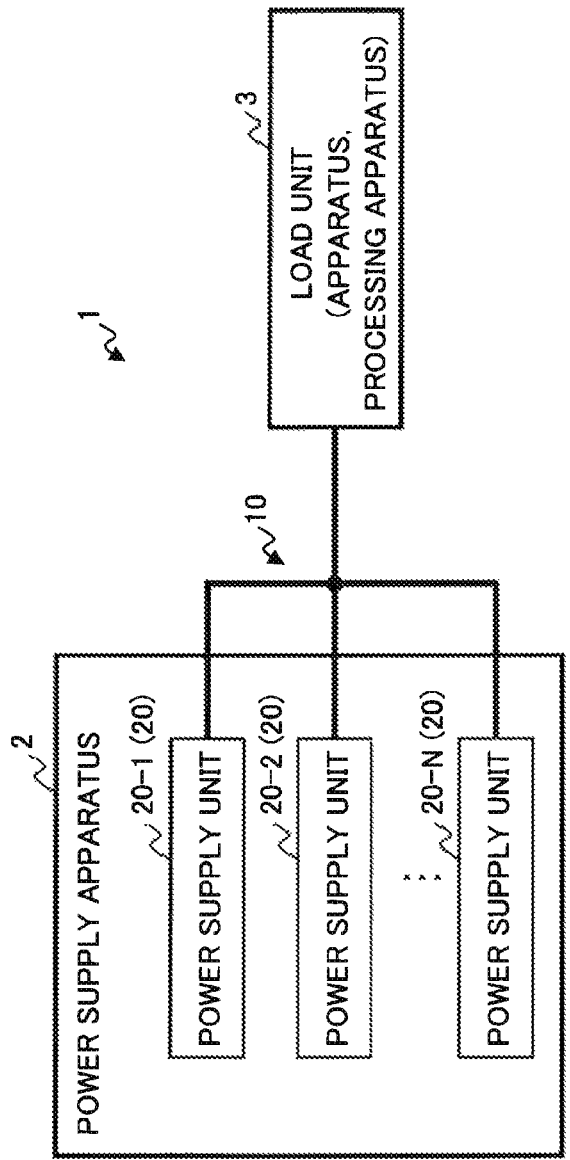
FIG. 1 is a block diagram illustrating a configuration example of an information processing system according to an embodiment of the present invention.
Figure 2:
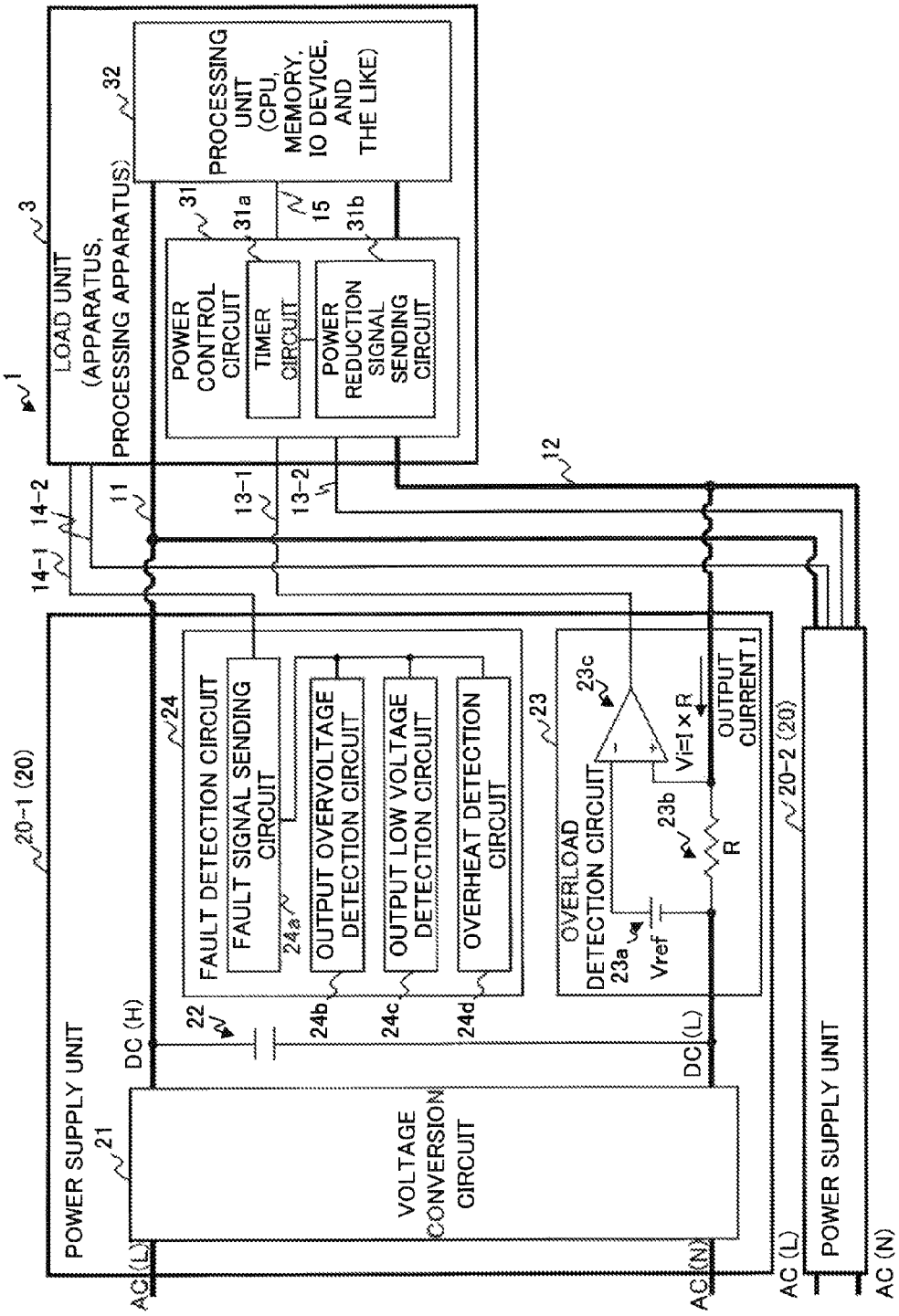
FIG. 2 is a block diagram illustrating a detailed configuration example of the information processing system illustrated in FIG. 1.

FIG. 1 is a block diagram illustrating a configuration example of an information processing system 1 according to an embodiment of the present invention and FIG. 2 is a block diagram illustrating a detailed configuration example of the information processing system 1 illustrated in FIG. 1.

As illustrated in FIG. 1, the information processing system 1 includes a power supply apparatus 2 including a plurality of (for example, N) power supply units 20-1 to 20-N that supply power, and a load unit 3 that is operated using power supplied from the power supply apparatus 2.

The power supply units 20-1 to 20-N (N is an integer of 2 or more; hereinafter, simply referred to as a power supply unit 20 when the power supply units 20-1 to 20-N are not differentiated) each supply power to the load unit 3 via a power supply line 10 (power supply lines 11 and 12 to be described below). Hereinafter, the detailed configurations of the power supply unit 20 and the load unit 3 will be described with reference to FIG. 2. Note that, FIG. 2 illustrates the case in which the number (N) of power supply units 20 used in consideration of a design of the system is 2. In addition, each power supply unit 20 has the same configuration, but in FIG. 2, for simplification of drawings, the configuration of the power supply unit 20-2 is not illustrated.

The power supply unit 20 includes a voltage conversion circuit 21, an output capacitor 22, an overload detection circuit 23, and a fault detection circuit 24.

The voltage conversion circuit 21 converts input voltage into output voltage within a predetermined voltage range. The output voltage converted by the voltage conversion circuit 21 is supplied to the load unit 3 via the power lines 11 and 12 through the output capacitor 22. In the example illustrated in FIG. 2, the voltage conversion circuit 21 outputs AC voltage input from terminals of AC (L) and AC (N) into DC voltage within a predetermined voltage range and outputs the DC voltage from terminals of DC (H) and DC (L).

Note that, current output from the voltage conversion circuit 21 includes bias (DC component) and a ripple component of current output from a power supply unit #0.

The output capacitor 22 stabilizes the output voltage converted by the voltage conversion circuit 21. In addition, the output capacitor 22 accumulates charges according to voltage converted by the voltage conversion circuit 21 and outputs supply power to the load unit 3.

In detail, the output capacitor 22 smoothes the ripple component included in the output current from the voltage conversion circuit 21 by charging and discharging and outputs the output current as the bias from the power supply unit #0. In addition, the output capacitor 22 supplies overload current to the load unit 3 when the power supply unit 20 is overloaded. Note that, the overload current may not be supplied by the voltage conversion circuit 21 having a slow response speed to the overload of the power supply unit 20. Therefore, the output capacitor 22 according to the present embodiment supplies the overload current for the load unit 3 by charges accumulated therein. Note that, in the example illustrated in FIG. 2, the output capacitor 22 is connected between the terminals of the DC (H) and DC (L) of the voltage conversion circuit 21 in parallel.

The overload detection circuit 23 detects an overload of the output capacitor 22. In addition, when detecting an overload, the overload detection circuit 23 notifies the load unit 3 of an overload signal requiring a suppression of power consumption as a signal indicating the overload of the power supply unit 20.

In detail, the overload detection circuit 23 detects an overload when the output current from the power supply unit 20 exceeds a preset overload detection threshold value (predetermined threshold value). In addition, the overload detection circuit 23 immediately notifies the load unit 3 of the overload signal (overload detection signal) that is a trigger of power saving at the load unit 3. Note that, the overload detection circuit 23 may use output current I input from the load unit 3 via, for example, the power line 12 at the time of measuring the output current from the power supply unit 20. Hereinafter, as illustrated in FIG. 2, it will be described that the overload detection circuit 23 detects the overload of the power supply unit 20 based on the output current I from the load unit 3.

An example of the case in which the overload detection circuit 23 detects the overload may include the case in which the output current burdened by the remaining power supply units 20 is increased due to at least one faulty power supply unit 20 of the plurality of power supply units 20, and the like. Note that, when the plurality of power supply units 20 have the same performance (supply capability of the power supply, and the like), the overload detection circuits 23 of these power supply units 20 each detect an overload and send an overload signal.

The overload signal is sent only when the power supply unit 20 (overload detection circuit 23) detects an overload. Therefore, even when one power supply unit 20 is in a faulty state, if the overload detection circuits 23 of the remaining normal power supply units 20 do not detect an overload, the overload signal is not sent, such that the power saving may be suppressed at the load unit 3.

Further, when the overload is not detected in the state in which the overload is detected, the overload detection circuit 23 suppresses the notification of the overload signal.

As illustrated in FIG. 2, the overload detection circuit 23 includes a reference voltage source 23a, an output current detection resistor 23b, and a comparison circuit 23c.

The reference voltage source (voltage source) 23a is a voltage source that outputs reference voltage Vref representing an overload detection threshold value. As the reference voltage source 23a, a circuit, which generates constant voltage, such as the voltage conversion circuit 21 or a constant voltage circuit that outputs constant voltage from another power supply, may be used.

The output current detection resistor (resistor) 23b is a resistor element that has a resistance value R and generates voltage Vi=I×R according to the output current I from the load unit 3.

The comparison circuit 23c is supplied with the reference voltage Vref from the reference voltage source 23a and the voltage Vi generated by the output current detection resistor 23b. Further, the comparison circuit 23c is configured so that an internal comparator sends the overload signal when the output current (the output current I from the load unit 3) from the power supply unit 20 and the voltage Vi generated by the resistance value R of the output current detection resistor 23b exceed the reference voltage Vref. Note that, as the comparison circuit 23c, a comparator, such as an OP AMP, a comparator, and the like, may be used.

The fault detection circuit 24 sends the fault signal representing that the fault occurs when the fault of the power supply unit 20 is detected and includes a fault signal sending circuit 24a, an output overvoltage detection circuit 24b, an output low voltage detection circuit 24c, and an overheat detection circuit 24d.

The output overvoltage detection circuit 24b detects the output overvoltage and outputs an output overvoltage signal to the fault signal sending circuit 24a when the voltage on the power line 11 is higher than a target voltage of the output voltage from the power supply unit 20 or an overvoltage detection threshold value set higher than the target voltage. Further, the output low voltage detection circuit 24c detects the output low voltage and outputs an output low voltage signal to the fault signal sending circuit 24a when the voltage on the power line 11 is lower than a target voltage or a low voltage detection threshold value set lower than the target voltage.

The overheat detection circuit 24d detects the overheat of the power supply unit 20 and outputs an overheat signal to the fault signal sending circuit 24a when a temperature sensor (not illustrated) provided in the power supply unit 20 is higher than an overheat detection threshold value.

The fault signal sending circuit 24a sends the fault signal to the load unit 3 or a monitoring apparatus of the information processing system 1, and the like, via a control line 14-1 or 14-2 when receiving the signal indicating the abnormality of the power supply unit 20 from at least one of the output overvoltage detection circuit 24b, the output low voltage detection circuit 24c, and the overheat detection circuit 24d. Note that, it is preferable to notify a manager of the information processing system 1 of the fault (display on an output device such as a monitor (not illustrated), and the like), and the like by the load unit 3 or the monitoring device notified with a fault signal.

The load unit (apparatus, processing apparatus) 3 is a load in the information processing system 1 and includes a power control circuit 31 and a processing unit 32.

The processing unit 32 is operated using power supplied from the power supply apparatus 2 and for example, serves as a processor that allows the information processing system 1 to execute various processing. An example of the processing unit 32 may include a CPU, a memory deploying a program executed by the CPU, and an IO device including a disk device holding program, data, and the like. Note that, the processing unit 32 also includes a device operated using the power supplied from the power supply apparatus 2 via the processing unit 32 even when not being physically mounted in the load unit 3, such as an IO device of, for example, a universal serial bus (USB) bus power, and the like.

The power control circuit 31 is a circuit that controls the processing unit 32 to execute the power saving and when receiving the overload signal from the power supply unit 20 (overload detection circuit 23), instructs the processing unit 32 to reduce power consumption. The power control circuit 31 includes a timer circuit 31a and a power reduction signal sending circuit 31b.

When the overload signal is notified from at least one power supply unit 20 of the plurality of power supply units 20, the timer circuit 31a is a circuit that performs a time measurement in a predetermined period.

Note that, the predetermined period is determined in advance according to the characteristics of the output capacitor 22. For example, it is preferable that the predetermined period is a period for securing the time when the output capacitor 22 charges the charges discharged as the overload current. In this case, the timer circuit 31a is set with a predetermined period performing the time measurement, based on the capacity of the output capacitor 22 and the output voltage of the power control circuit 31.

The power reduction signal sending circuit 31b sends the power reduction instruction (power reduction signal) instructing the suppression (power saving) of power consumption to the processing unit 32, from the overload signal is notified until the timer circuit 31a expires. Note that, for example, the power reduction signal is a signal instructing the processing unit 32 to suppress power consumption of the power supplied from one power supply unit 20.

In detail, when receiving the overload signal from the power supply unit 20, the power reduction signal sending circuit 31b instructs the power reduction of one power supply unit to the processing unit 32 via the control line 15. The power reduction instruction (power reduction signal) continuously is sent for the constant time (predetermined time), from the overload signal is received from the power supply unit 20 by the power reduction signal sending circuit 31b until the time measurement by the timer circuit 31a expires.

Note that, in the case in which the power supply apparatus 2 includes three or more power supply units 20, when the overload signal is notified from the plurality of remaining power supply units 20 due to the fault of one power supply unit 20, the power control circuit 31 is operated as follows. That is, the timer circuit 31a starts the time measurement for a predetermined period when the overload signal is notified for the first time and the power reduction signal sending circuit 31b sends the power reduction signal to the processing unit 32 until the overload signal is notified for the first time and then the timer circuit 31a expires.

The processing unit 32 suppresses the power consumption (executes the power saving) while the power reduction signal is input from the power reduction signal sending circuit 31b. Note that, the power saving means that the load power of the information processing system 1 is suppressed to equal to or less than the power supplied from the power supply apparatus 2 (all the power supply units 20 that are being operated). An example of the power saving of the processing unit 32 may include the reduction in the operation frequency of the CPU, the stopping or reduction of the supply power to the non-active IO device, and the like.

Note that, a time lag occurs until the load current is actually reduced by the power saving by the processing unit 32. Therefore, it is preferable to send the power reduction signal within the predetermined period for which the timer circuit 31a measures time and then have a margin including the time lag until the load current is reduced in the processing unit 32.

The processing unit 32 performs the suppression of power consumption of the power supplied from one power supply unit 20 in the power saving when a part of the power supply units 20 are faulty and the remaining power supply units 20 detect overload. That is, the processing unit 32 reduces the power consumption to the power supplied by the N−1 remaining power supply units, in the power saving. Therefore, even when one power supply unit 20 is faulty, the processing unit 32 may be operated with the power supplied from the remaining power supply units 20 by the power saving.

Note that, the processing unit 32 may receive the fault signal from the fault detection circuit 24 of the faulty power supply unit 20 to hold the number of faulty power supply units 20, the supply capability of power of the faulty power supply unit 20, and the like, in the memory, and the like. Therefore, the processing unit 32 may determine the suppressed power consumption in the power saving based on the information of the power supply unit 20 notifying the fault signal. For example, when two or more power supply units 20 are faulty, the processing unit 32 may perform the suppression of power consumption of the power supplied from the two or more faulty power supply units 20, in the power saving. That is, the processing unit 32 may reduce power consumption to the power supplied from the N−2 or less remaining power supply units 20 in the power saving.

As described above, when the power supply apparatus 2 may supply the power consumed in the load unit 3 by the remaining power supply units 20 even when one power supply unit 20 is faulty, the remaining power supply units 20 (overload detection circuit 23) does not detect the overload. Further, since the power control circuit 31 uses, as the overload signal, the trigger instructing the execution of the power saving by the processing unit 32, when the overload signal is not received from the remaining power supply units 20, the power control circuit 31 does not output the power reduction signal and the processing unit 32 does not execute the power saving.

Therefore, according to the information processing system 1 according to the present embodiment, even though a part of the power supply units 20 are faulty, the remaining power supply units 20 do not detect the overload, the system does not execute the power saving and may keep the performance of the system as high as possible.

However, as described above, the power supply unit 20 discharges the charges accumulated in the output capacitor 22 as the overload current when the overload is detected. Therefore, when the overload is continuously detected, the charges of the output capacitor 22 is reduced, and thus the overload current lacks and the power supply unit 20 reduces the output voltage. In this state, the power supply unit 20 cannot supply the output voltage within a predetermined voltage range to the load unit 3, and thereby the system may be down.

In connection with this, the power control circuit 31 according to the embodiment of the present invention instructs the power saving to the processing unit 32 when receiving the overload signal from the power supply unit 20. Therefore, the continuous overload may not be generated to the power supply unit 20 by the power control circuit 31, thereby reducing the possibility of the system down.

Note that, after the power reduction signal stops (that is, after the time measurement of the timer circuit 31a expires), the power saving is released in the processing unit 32 and as before the power saving is executed, the increase in load current is expected.

Therefore, according to the power control circuit 31 according to the present embodiment, the time when the charges discharged from the output capacitor 22 are charged in the output capacitor 22 is secured in the predetermined period for which the power reduction signal is transmitted. Therefore, the power supply unit 20 may charge the output capacitor 22 against the next expected overload in the power saving of the processing unit 32 performed for a predetermined period. Therefore, even when the overload is detected after the power saving, the power supply unit 20 can reduce the possibility of the system down, without being short of the overload current from the output capacitor 22 and reducing the output voltage.

As described above, according to the information processing system 1 according to the present embodiment, when a part of the power supply units 20 are faulty, and thus the remaining power supply units 20 detect the overload, since the power consumption of the load unit 3 is reduced to the power supplied from the N−1 remaining power supply units (executes the power saving), the system may be continuously operated. Further, since the power saving is executed as much as the predetermined period securing the time when the output capacitor 22 is charged, the possibility of the system down may be reduced to keep the performance of the system as high as possible while continuously operating the system.

[1-2] Operation Example of Information Processing System

Next, the operation example of the information processing system 1 configured as above will be described with reference to FIGS. 3 to 5.

[1-2-1] Overall Operation Example

First, the overall operation example of the information processing system 1 will be described with reference to FIG. 3. FIG. 3 is a flowchart for describing the operation example of the information processing system 1 illustrated in FIG. 2.

Figure 3:
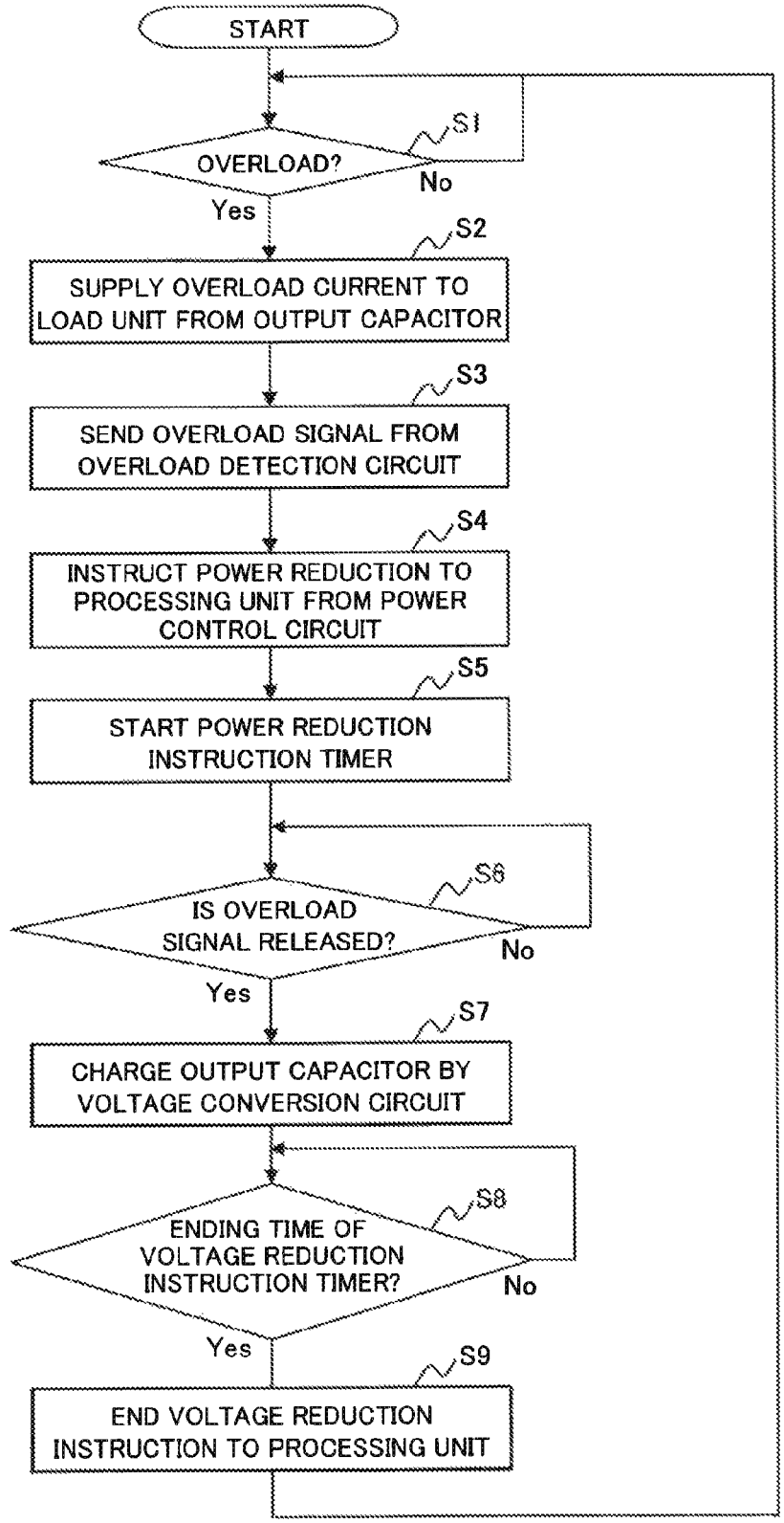
FIG. 3 is a flowchart for describing an operation example of the information processing system illustrated in FIG. 2.

As illustrated in FIG. 3, until the overload of the output capacitor 22, which supplies power to the load unit 3, is detected by the overload detection circuits 23 of each power supply unit 20, the determination is made based on the output current I from the load unit 3 (step S1 and No route of step S1). When the overload is detected (Yes route of step S1), in the power supply unit 20, the overload current to the load unit 3 is supplied from the output capacitor 22 via the power line 11 (step S2). In addition, the overload signal is sent to the load unit 3 via the control line 13-1 or 13-2 by the overload detection circuit 23 (step S3).

Next, when the overload signal is received by the power control circuit 31, the power reduction instruction (voltage reduction signal) is output to the processing unit 32 by the power reduction signal sending circuit 31b (step S4) and the power reduction instruction timer (time measurement within the predetermined time) starts by the timer circuit 31a (step S5). At this time, the power saving is executed by the processing unit 32 that has received the power reduction instruction.

In the power supply unit 20, the overload is removed by the overload detection circuit 23 and the determination is made until the sending of the overload signal is released (step S6, No route of step S6) and if the sending of the overload signal is released (Yes route of step S6), the sending of the overload signal is released. When the overload is removed, the output capacitor 22 is charged by the voltage conversion circuit 21 (step S7).

Meanwhile, in the power control circuit 31, the time measurement is made by the timer circuit 31a until the voltage reduction instruction timer becomes an ending time (step S8, No route of step S8). When the voltage reduction instruction timer expires (Yes route of step S8), the sending of the voltage reduction instruction to the processing unit 32 ends by the power reduction signal sending circuit 31b (step S9) and the process proceeds to step S1. Note that, in step S7, the charging of the output capacitor 22 is performed until step S9 is executed.

As described above, in the information processing system 1, the processing of steps S1 to S9 is repeatedly executed to perform the power control.

[1-2-2] Specific Operation Example

Next, the detailed operation example of the information processing system 1 will be described with reference to FIGS. 4 and 5. FIG. 4 is a diagram for describing an example of the power supply control processing in the information processing system 1 illustrated in FIG. 2 and FIG. 5 is a time chart for describing an example of the power supply control processing in the information processing system 1 illustrated in FIG. 4. Note that, FIG. 4 illustrates the case in which the number (N) of power supply units 20 used in terms of the design of the system is 2. In addition, for simplification of drawings, FIG. 4 does not illustrate a part of components. Note that, in FIGS. 4 and 5, the power supply units 20-1 and 20-2 are referred to as power supply units #0 and #1, respectively.

Figure 4:
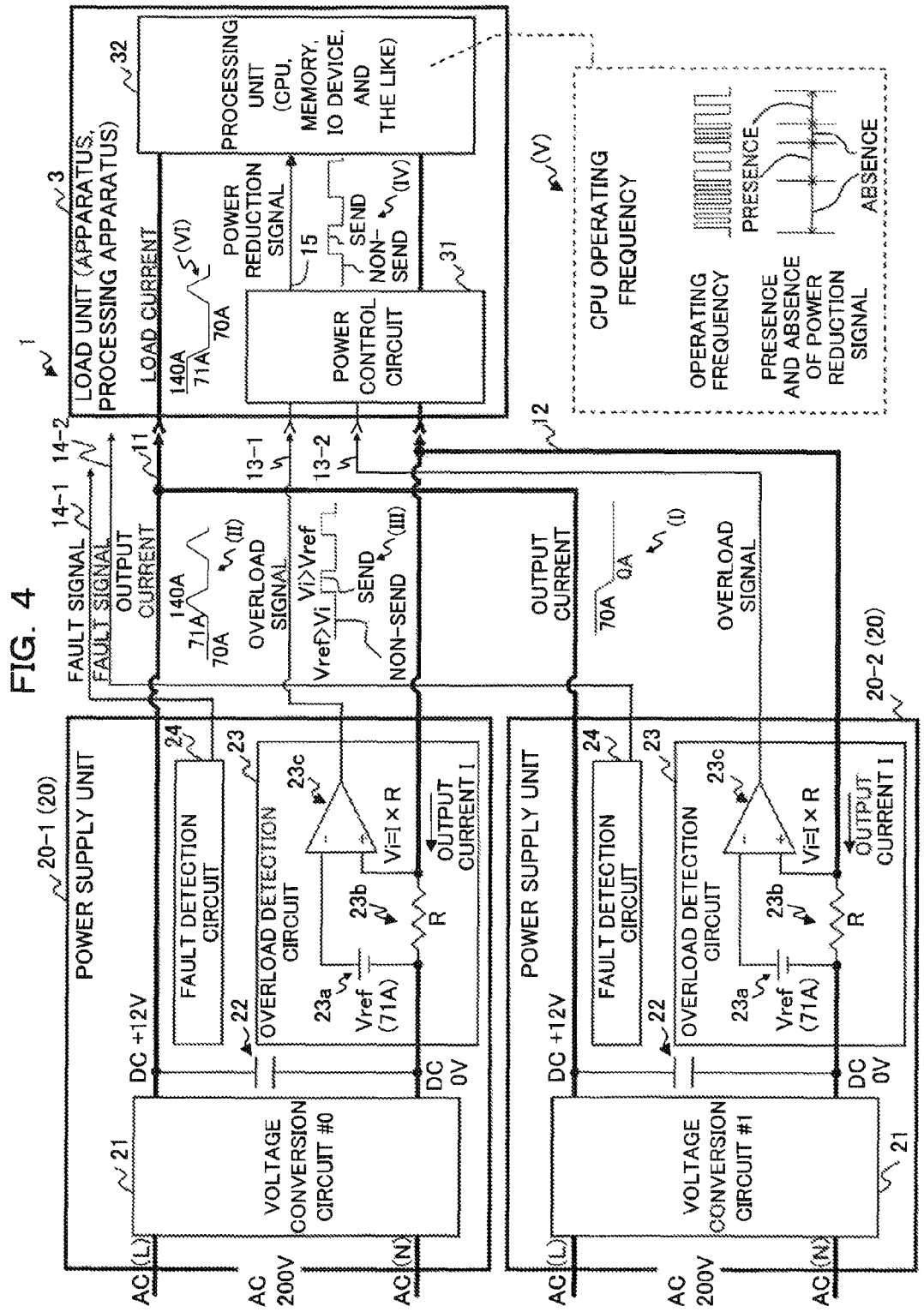
FIG. 4 is a diagram for describing an example of power supply control processing in the information processing system illustrated in FIG. 2.

Note that, in the example illustrated in FIG. 4, the voltage conversion circuit 21 converts AC200 V from the AC (L) and the AC (N) into DC voltage of DC+12 V. Further, the load current of the system (load unit 3) is 140 A when the load of the system is maximum and when being normally operated, the power supply units 20-1 and 20-2 output the output current of 70 A via the power line 11, respectively. In addition, the reference voltage source 23a of the overload detection circuit 23 is set with the voltage of which the overload is detected by the comparison circuit 23c when the output current I is 71 A as the reference voltage Vref that is the overload detection threshold value. Therefore, when the two power supply units 20 are normal, even though the load of the system is maximum, the load unit 3 does not detect the overload and the power saving is not executed in the load unit 3 (see time t0 of FIG. 5).

Here, when the load of the system is maximum, if the power supply unit #1 is faulty, the output current of the power supply unit #1 becomes from 70 A to 0 A and the output current of the power supply unit #0 is increased from 70 A to 140 A (see (I) and (II) of FIG. 4 and time t1 of FIG. 5). Further, in the overload detection circuit 23 of the power supply unit #0, the output current I is beyond 71 A and thus becomes voltage Vi>reference voltage Vref and the comparison circuit 23c detects the overload such that the overload signal becomes "H" (valid) (see (III) of FIG. 4 and time (t1+T1) of FIG. 5 (after the lapse of 5 μs from t1)).

Further, the power reduction signal sending circuit 31b receives the overload signal, and thus the power reduction instruction to the processing unit 32 becomes "H" (see (IV) of FIG. 4 and the time (t1+T2) of FIG. 5 (after 10 μs from t1 lapses)). The power reduction instruction is continuously kept "H" for 10 ms (see period T4 of FIG. 5). Note that, the period T4 is a predetermined period for which the time is measured by the timer circuit 31a.

When receiving the power reduction instruction, the processing unit 32 reduces the operating frequency (see (V) of FIG. 4) and suppresses the load current to the supply current 70 A of the power supply unit #0 (see (VI) of FIG. 4 and time t1+T2 to time t2 of FIG. 5). Note that, by the power saving, until the load current of the load unit 3 is reduced to 70 A, the power supply unit #1 is faulty, and then the time lag of 40 μs occurs (see period T3 of FIG. 5) and the power reduction instruction is sent and then the time lag of 30 μs occurs.

Here, in the time (t1 to t2) of FIG. 5, when the overload of the power supply unit #0 is detected, the output capacitor 22 adds and outputs the accumulated charges as the overload current to the charging and discharging from the power control circuit 31. In the example illustrated in FIG. 5, the output capacitor 22 outputs a current of about 60 A to 80 A in time t1 to t2. Note that, in FIG. 5, the charging in the output capacitor 22 is represented as a current of "+" and the discharging from the output capacitor 22 is represented as a current of "−".

Further, as described above, the overload current is not supplied from the voltage conversion circuit 21 and thus is supplied by the charges accumulated in the output capacitor 22. That is, in time t1 to t2 of FIG. 5, the output current from the power supply unit #0 becomes the added current of the output current 70 A from the voltage conversion circuit 21 and 60 A to 80 A that is the discharge current from the output capacitor 22.

Note that, the output capacitor 22 generates the supply power by alternately repeating the charging of charges and the discharging of accumulated charges according to the output voltage (ripple component) from the voltage conversion circuit 21. In the case in which the output capacitor 22 is in a normal state, the discharging time is equal to the charging time (for example, see the time t1 to t2 of FIG. 5). In the time t2 of FIG. 5, when the processing unit 32 carries out the power saving, in the time t2 to t4 (during the predetermined period), in connection with the charging and discharging current in and from the output capacitor 22 from the voltage conversion circuit 21, the charging time accumulating charges is longer than the discharging time outputting the supply power and charges are charged in the output capacitor 22.

In the time t4 of FIG. 5, when the timer circuit 31a expires and the power reduction signal is "L" (invalid), the processing unit 32 ends the power saving. However, according to the operation situations of the system, even after the power saving ends, there may be a case in which the load current does not exceed 70 A.

However, the supply power of the power system (power supply apparatus 2) is equal to or more than the load power of the system and is designed in consideration of a margin. In addition, the system (load unit 3) uses, about 70% of the rated power of the power supply system (power supply apparatus 2) as the load power. In addition, in the actual operation of the information processing system 1, such as a server apparatus, and the like, the case in which the option configuration of IO or the like is fully mounted is rare, and the load power of the system is reduced in an amount of the power consumption of the configuration that is not mounted. Further, the case in which the CPU is operated as the operating ratio of 100% at all times may be rare and the CPU is generally operated at about 30%.

In connection with the above aspect, the load unit 3 may use the load power of about 30% to 70% of the rated power of the power supply apparatus 2.

Therefore, for example, when the load of the system is approximately middle, even though the power supply unit #1 is faulty, if the load current of the system does not exceed the overload detection threshold value 71 A of the power supply unit #0, the power supply unit 20 does not transmit the overload signal and the power reduction signal sending circuit 31b does not transmit the power reduction signal. Therefore, the processing unit 32 does not carry out the power saving (see time t4 to t6 of FIG. 5).

Meanwhile, in the time t6 of FIG. 5, when the load current of the load unit 3 (processing unit 32) is increased, similar to the time t1 to t2, the power supply unit #0 sets the overload signal to "H" (see time t6+T1) and the power reduction signal sending circuit 31b sets the power reduction instruction to "H" (see the time t6+T2). Further, in the time t7 to t8, the charges from the output capacitor 22, which consumed in the period T3 of the time t6 to t7, are charged.

As described above, according to the power supply apparatus 2 according to the present embodiment, when the overload of the output capacitor 22 is detected by the overload detection circuit 23, the overload signal requesting the suppression of power consumption is notified to the load unit 3. Therefore, even though a part of the plurality of power supply units 20 are faulty, when the load power of the system does not exceed the supply power of the operating power supply unit 20 (when the overload is not detected), the request of the power saving of the system is not carried out.

Comparing with the information processing system 100 illustrated in FIG. 6, the power reduction instruction of the load unit 300 is continuously sent until the faulty power supply unit 200 is exchanged with a normal power supply unit 200. In addition, the load power of the system in the actual operation is operated as about 30 to 70% of the supply power of the power supply unit 200. That is, according to the operating state of the system, the power saving is carried out by the faulty of the power supply unit 200 even in the state in which the power saving is unnecessary.

As described above, in the information processing system 100 illustrated in FIG. 6, when the power supply unit 200 is faulty, the performance of the system is continuously reduced. Therefore, the information processing system 100 is an inefficient control in terms of an actual operation as a server apparatus.

In connection with this, in the power supply apparatus 2 according to the present embodiment, when the load power of the system does not exceed the supply power of the operating power supply unit 20, the request of the power saving is not carried out. Therefore, the performance of the system is used as valid as possible, such that the performance of the system may be kept as high as possible.

Further, even though the faulty power units are not yet exchanged (mounted) after a part of the power supply units 20 are faulty, when the overload is detected by the remaining power supply unit 20, the power saving is requested to the load unit 3. Accordingly, the remaining power supply unit 20 may not continuously generate the overload.

Further, according to the load unit 3 according to the present embodiment, until the overload signal is notified by the power reduction signal sending circuit 31b, and then the timer circuit 31a expires, the power reduction signal instructing the suppression of power consumption is sent to the processing unit 32. Therefore, the time charging the charges discharged by the output capacitor 22 may be secured for the predetermined period for which the timer circuit 31a measures the time and the power supply unit 20 may be prepared for overload due to the increase in load current after the power reduction signal ends. In addition, when the timer circuit 31a expires, the sending of the voltage reduction signal stops, and therefore the execution of the power saving by the processing unit 32 is released. Therefore, the performance of the system may be kept as high as possible.

Further, according to the information processing system 1 according to the present embodiment, the power supply unit 20 may be configured in N numbers, not being configured in N+1 numbers of the related art having a redundancy configuration and the number and the mounting area of power supply units 20 may be reduced.

[2] Others

As described above, the preferred embodiments and modified examples of the present invention have been described, but the present invention is not particularly limited to specified embodiments or modified examples, and the present invention may be variously modified and changed without departing from the gist of the present invention.

For example, each circuit of the foregoing power supply unit 20 may be separated or merged from or with any combinations.

As an example, the function of sending the overload signal to the load unit 3 by the overload detection circuit 23 (comparison circuit 23c) may be included in the external circuit of the overload detection circuit 23. That is, when the overload detection circuit 23 detects the overload of the power supply unit 20, a signal indicating that the overload is detected may be sent to a circuit (notification circuit) (not illustrated) and the notification circuit may send the overload signal to the load unit 3.

According to the disclosed technology, in the system including the plurality of power supply units, even though a part of the power supply units are faulty, the performance of the system may be kept as high as possible.

All examples and conditional language provided herein are intended for pedagogical purposes to aid the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A power supply apparatus comprising a plurality of power supply units that supply power, wherein each of the power supply units includes:
   a voltage conversion circuit that converts input voltage into output voltage within a predetermined voltage range;
   an output capacitor that outputs supply power while accumulating charges according to the voltage converted by the voltage conversion circuit; and
   an overload detection circuit that detects an overload of the output capacitor and when the overload is detected, notifies a processing apparatus operated using the power supplied from each of the plurality of power supply units of an overload signal requesting a suppression of power consumption of a load,
   wherein the overload detection circuit notifies the processing apparatus of the overload signal while output current inputted from the processing apparatus to the overload detection circuit exceeds a predetermined threshold value, the output current being return current from the processing apparatus to at least one of the plurality of power supply units.

2. The power supply apparatus according to claim 1, wherein the overload detection circuit includes:

a voltage source that outputs reference voltage indicating the predetermined threshold value;

a resistor that is applied voltage according to the output current from the processing apparatus; and a comparison circuit that receives the reference voltage and the voltage applied to the resistor and outputs the overload signal when the voltage applied to the resistor exceeds the reference voltage.

3. The power supply apparatus according to claim 1, wherein after the overload detection circuit detects the overload and notifies the processing apparatus of the overload signal, a time when the charges according to the voltage converted by the voltage conversion circuit are accumulated in the output capacitor is longer than a time when the supply power is output, during a predetermined period in which the power consumption of the processing apparatus is suppressed.

4. The power supply apparatus according to claim 1, wherein the overload detection circuit continuously notifies the processing apparatus of the overload signal during the detection of the overload and when the overload is not detected, suppresses the notification of the overload signal.

5. A processing apparatus, comprising:
a processing unit; and
a power control circuit,
wherein the processing unit is operated using power supplied from each of a plurality of power supply units that supply power, the plurality of power supply units being included in a power supply apparatus,
the power control circuit performs time measurement of a predetermined period when an overload signal indicating an overload of a power supply unit is notified from at least one power supply unit of the plurality of power supply units,
the power control circuit sends a power reduction signal instructing a suppression of power consumption of a load to the processing unit during an expiration of the time measurement of the predetermined period after the overload signal is notified, and
the overload signal is notified while output current inputted from the processing apparatus to the at least one power supply unit exceeds a predetermined threshold value, the output current being return current from the processing apparatus to at least one of the plurality of power supply units.

6. The processing apparatus according to claim 5, wherein the predetermined period is determined according to characteristics of an output capacitor being included in the power supply unit and outputting the supply power from the power supply unit while accumulating charges according to an input voltage.

7. The processing apparatus according to claim 5, wherein when the power reduction signal is sent,
the power reduction signal is continuously sent to the processing unit during the expiration of the time measurement of the predetermined period after the overload signal is notified, and
the processing unit suppresses power consumption of the load during an input of the power reduction signal.

8. The processing apparatus according to claim 5, wherein the power reduction signal is a signal instructing a suppression of power consumption of the load, an amount of the suppression corresponding to the power supplied from a faulty power supply unit to the processing unit, and the processing unit reduces the power consumption to power supplied from other power supply units other than the faulty power supply unit during an input of the power reduction signal.

9. An information processing system comprising:
a power supply apparatus including a plurality of power supply units that supply power; and
a processing apparatus operated using power supplied from each of the plurality of power supply units of the power supply apparatus,
wherein each of the power supply units includes:
a voltage conversion circuit that converts input voltage into output voltage within a predetermined voltage range;
an output capacitor that outputs supply power while accumulating charges according to the voltage converted by the voltage conversion circuit; and
an overload detection circuit that detects an overload of the output capacitor and when the overload is detected, notifies the processing apparatus of an overload signal requesting a suppression of power consumption of a load,
the processing apparatus includes:
a processing unit; and
a power control circuit,
wherein the processing unit is operated using power supplied from each of the plurality of power supply units,
the power control circuit performs time measurement of a predetermined period when the overload signal is notified from at least one power supply unit,
the power control circuit sends a power reduction signal instructing a suppression of power consumption of the load to the processing unit during an expiration of the time measurement of the predetermined period after the overload signal is notified, and
the overload detection circuit notifies the processing apparatus of the overload signal while output current inputted from the processing apparatus to the overload detection circuit exceeds a predetermined threshold value, the output current being return current from the processing apparatus to at least one of the plurality of power supply units.

10. The information processing system according to claim 9, wherein the predetermined period is determined according to characteristics of the output capacitor.

11. The information processing system according to claim 9, wherein when the power reduction signal is sent,
the power reduction signal is continuously sent to the processing unit during the expiration of the time measurement of the predetermined period after the overload signal is notified, and
the processing unit suppresses power consumption of the load during an input of the power reduction signal.

12. The information processing system according to claim 9, wherein the power supply apparatus includes N (N is an integer of 2 or more) power supply units,
the power reduction signal is a signal instructing a suppression of power consumption of the load, an amount of the suppression corresponding to the power supplied from a faulty power supply unit to the processing unit, and
the processing unit reduces the power consumption of the load to power supplied from N−1 power supply units other than the faulty power supply unit during an input of the power reduction signal.

13. The information processing system according to claim 12, wherein each of the power supply units further includes:

a fault detection circuit that detects a fault of the power supply unit and when the fault is detected, notifies the processing apparatus of a fault signal indicating that the fault of the power supply unit occurs; and the processing unit determines suppressed power consumption of the load based on information on the power supply unit notifying the fault signal.

* * * * *